April 22, 1952  J. O. CREEK  2,594,130
TOOL DRESSER FOR PATTERN CONTROLLED MACHINE TOOLS
Filed Aug. 21, 1951  4 Sheets-Sheet 1

INVENTOR
J.O.CREEK
PER

ATTORNEY

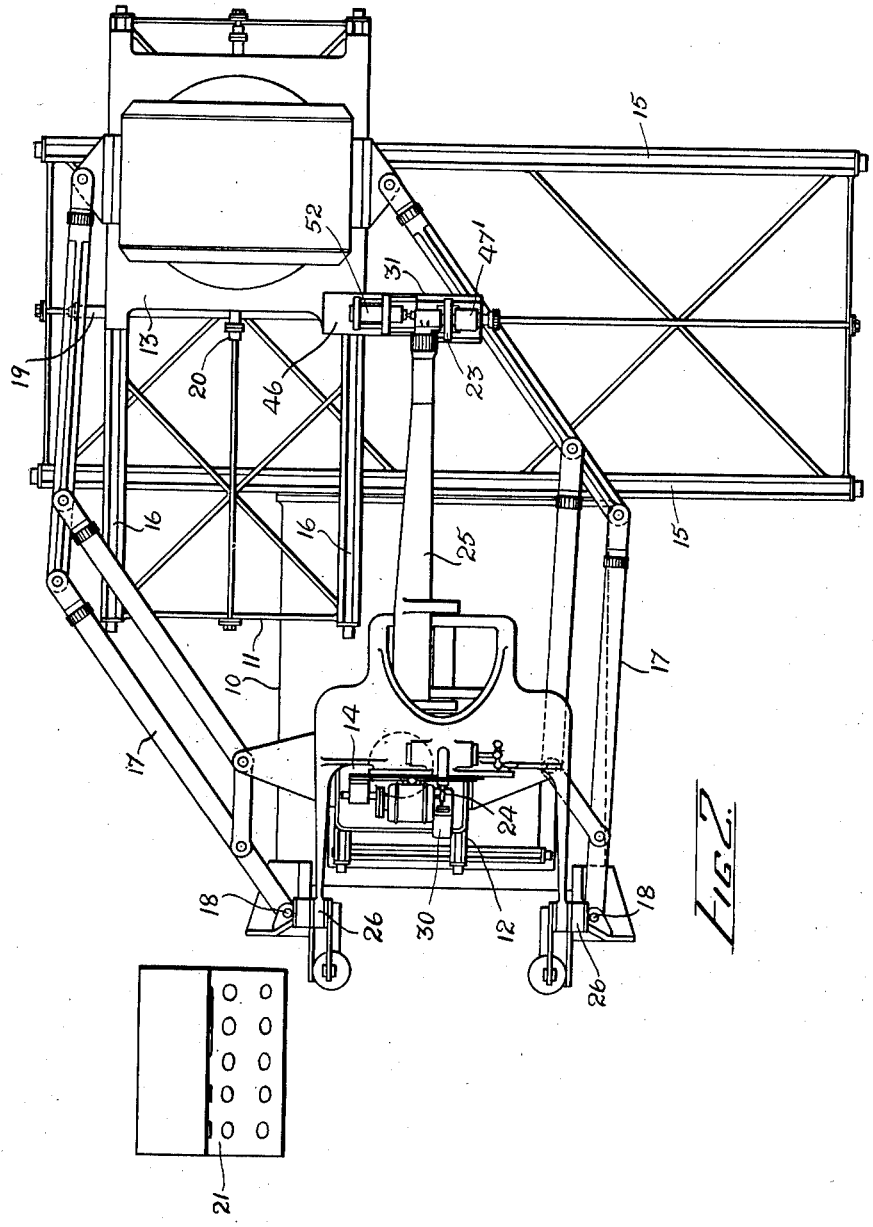

April 22, 1952 J. O. CREEK 2,594,130
TOOL DRESSER FOR PATTERN CONTROLLED MACHINE TOOLS
Filed Aug. 21, 1951 4 Sheets-Sheet 3
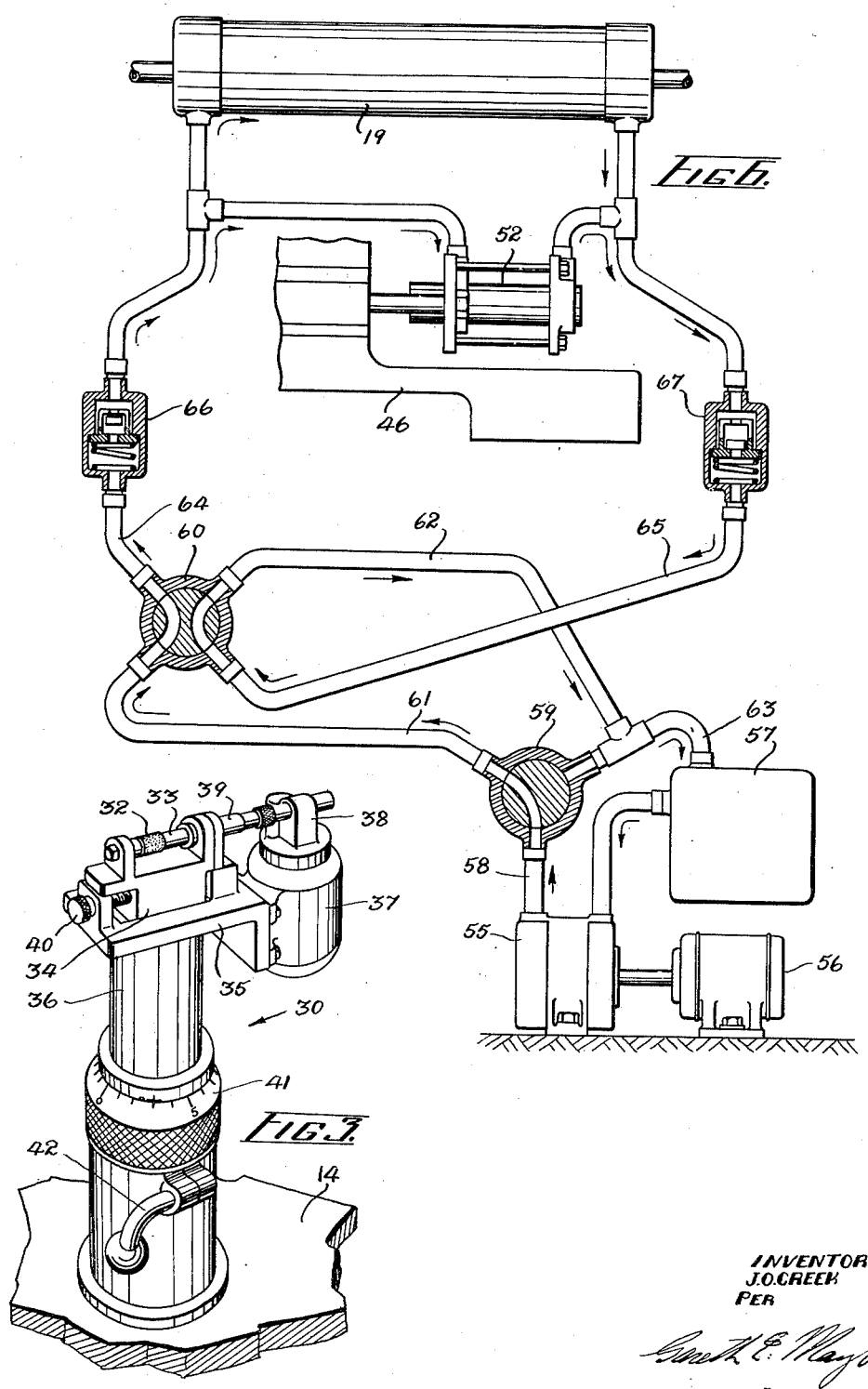
INVENTOR
J.O.CREEK
PER
ATTORNEY April 22, 1952 J. O. CREEK 2,594,130
TOOL DRESSER FOR PATTERN CONTROLLED MACHINE TOOLS
Filed Aug. 21, 1951 4 Sheets-Sheet 4
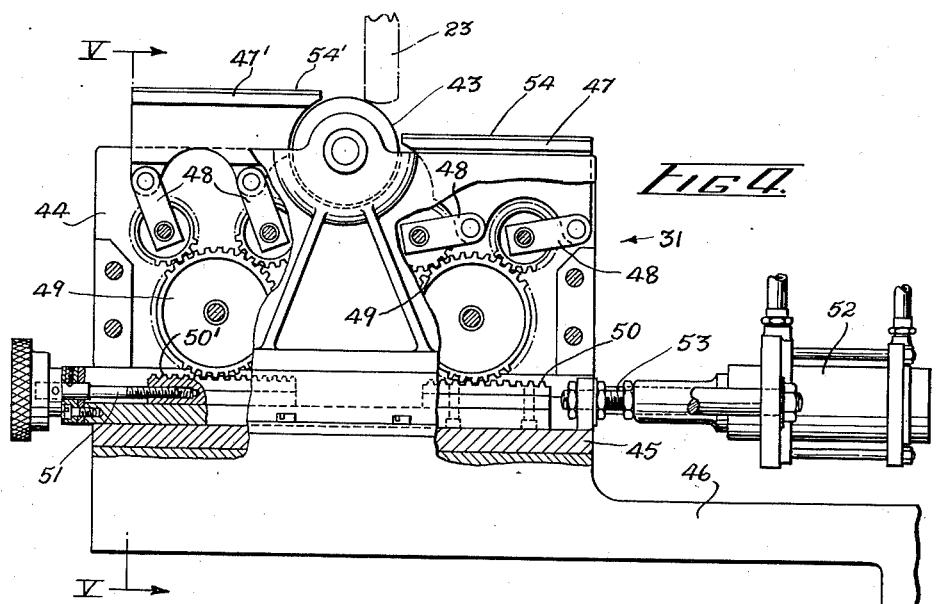
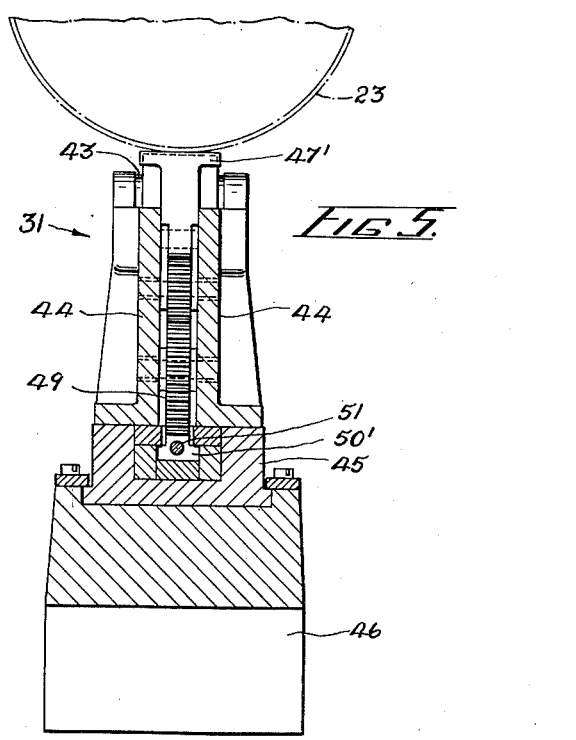
INVENTOR
J.O.CREEK
PER
ATTORNEY.

Patented Apr. 22, 1952

2,594,130

UNITED STATES PATENT OFFICE 2,594,130

TOOL DRESSER FOR PATTERN CONTROLLED MACHINE TOOLS

John Oliver Creek, Brampton, Ontario, Canada, assignor to A. V. Roe Canada Limited, Malton, Ontario, Canada, a corporation Application August 21, 1951, Serial No. 242,966
In Great Britain August 31, 1950

8 Claims. (Cl. 51—100)

The invention relates to automatic pattern controlled machine tools and in particular to the provision of means for truing and dressing the cutting tools thereof.

It is realized that there is a technical difference between truing and dressing operations and that the invention to which this specification refers is perhaps more strictly applicable to truing than to dressing, though the terminology in the art is loose and the operation is often called "form dressing." The difference between the operations is primarily associated with the speeds of feed and traverse of the truing or dressing tool and does not affect the general construction. The terms "truing" and "dressing" are therefore used synonymously in this specification and in the subjoined claims.

In pattern controlled machine tools it is necessary, if true reproduction is to be obtained, that the shape of the portion of the tool in cutting engagement with the workpiece should correspond to the shape of the portion of the tracer in tracing engagement with the pattern, and, if the reproduction ratio of the machine tool is other than 1 to 1, this correspondence must be in accordance with the said ratio. Hitherto, in order to obtain the necessary correspondence in shape between the tracer and the cutting tool, it has been the practice to mount the tool in a separate machine and to true it to the required shape by a diamond point or grinding wheel or other tool, as appropriate, with the aid of suitable measuring devices or templates.

An object of the present invention is the provision of an improved pattern controlled machine tool which will obviate the necessity for the use of a separate machine, in which to true the cutting tool to correspond to the shape of the tracer.

Another object of the invention is the provision of a dressing or truing reference which can be readily applied to pattern controlled machine tools so that the tool may be correctly dressed or trued by a simple tracing process similar to that for which the machine tool was designed.

In order that the application of the invention may be more fully understood an embodiment thereof will now be described in relation to an improved model of the pattern controlled machine tool described in United States Patent No. Re. 23,263 dated November 15, 1950. In the accompanying drawings forming a part of this application in which like characters of reference are used to designate like parts throughout the same:

Fig. 2 is a plan of the machine shown in Fig. 1;

Fig. 3 is a perspective of a tool dresser unit;

Fig. 4 is a side elevation, partly in section, of a dresser reference unit, viewed in the direction of the arrow IV in Fig. 1;

Fig. 5 is a cross-section of the dresser reference unit taken through the line V—V in Fig. 4; and Fig. 6 is a diagram showing the essential features of part of the hydraulic system.

Figure 1:
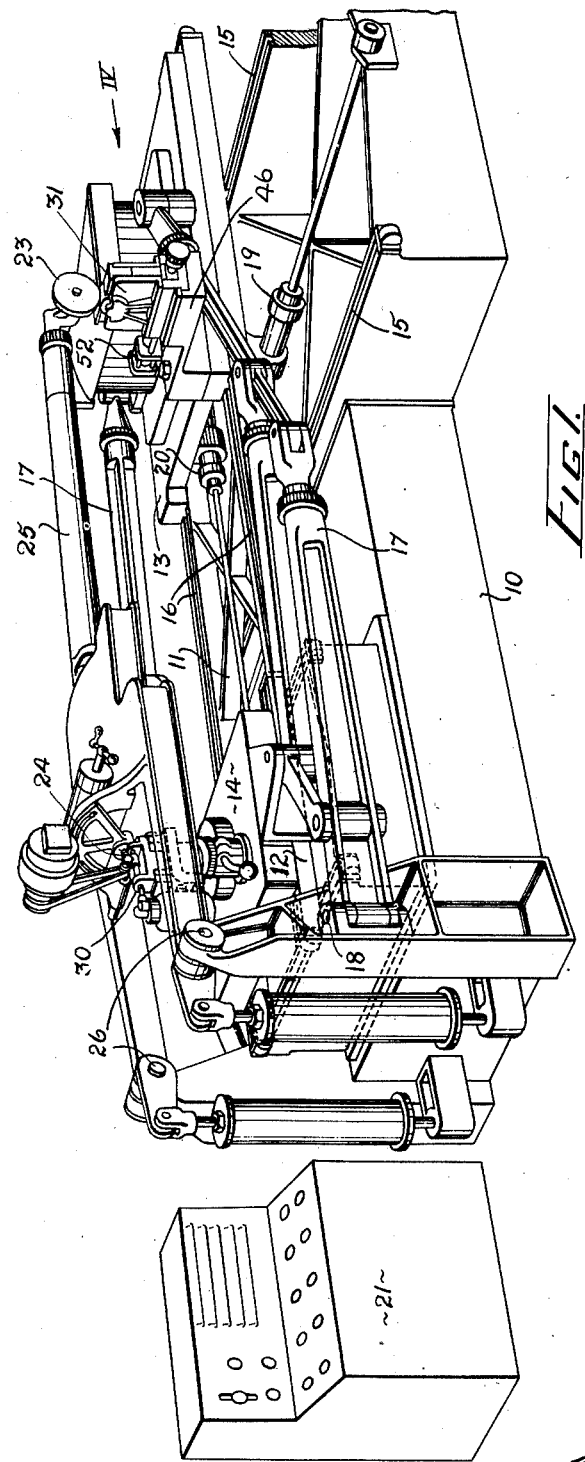
Fig. 1 is a perspective of a three dimensional copying machine incorporating the invention.

It will be seen, in reference to Figs. 1 and 2, that the pattern controlled machine tool to which, in this example, the tool dresser and reference are applied comprises a frame 10 supporting a pattern table carriage 11 and a worktable carriage 12, on which are mounted, respectively, a pattern table 13 and a worktable 14. The pattern table carriage is mounted on the frame through a pair of horizontal linear ball bearings 15 and the pattern table is mounted on the carriage through similar bearings 16, which are disposed at right angles to the bearings 15 and also lie in a horizontal plane. Thus the pattern table is free to move in any direction in a horizontal plane, that is in two dimensions, relative to the frame. The worktable is mounted in a like manner and is also free to move, relative to the frame, in any direction in a horizontal plane.

The two tables are interconnected by a double pantograph linkage 17 which is anchored to the frame at two vertically disposed pivots 18; any movement of the pattern table, upon which a pattern may be mounted, is accompanied by a like movement of the worktable, carrying a workpiece, in accordance with the ratio determined by the configuration of the pantograph linkage. The said configuration is of course dictated by the scale of reproduction required.

In the machine herein described motive power for the horizontal movement of the tables is provided by a hydraulic piston and cylinder motor 19 mounted on the frame 10 to drive the carriage 11 transversely of the machine (that is, at right angles to the direction of the arrow IV), and by a hydraulic piston and cylinder motor 20 mounted on the carriage 11 to drive the pattern table 13 longitudinally (that is, parallel to the direction of the arrow IV). These motors are controlled by an operator at the control panel 21 and by preset adjustable trip valves which effect reciprocation and indexing of the pattern table at the end of each stroke.

A tracer wheel 23 and a rotary cutting tool 24 are mounted above the pattern table 13 and the worktable 14 respectively, and are carried on a reproduction lever 25. The fulcrum of the lever 25 is provided by horizontally disposed pivots 26 which lie in the vertical plane of the pantograph pivots 18. Moreover the distances of the tracer 23 and the tool 24 from the pivots 26 are in the same proportion as that relating the movements of the pattern table 13 and the worktable 14 by the double pantograph linkage 17. Thus when the tracer is in engagement with a pattern on the pattern table 13 and the tool is in engagement with a workpiece on the worktable 14, it will be evident that as the tracer, under the influence of its weight, follows the contour of the pattern, the rise and fall of the tool will bear to the rise and fall of the tracer the same proportion as that relating the horizontal translations of the workpiece and the pattern, by virtue of the like ratios of the lever 25 and the pantograph linkage 17. Thus reproduction, to the same scale in three dimensions, can be achieved.

For accurate work it is clearly of great importance that the dimensions of the tracer wheel 23 and the cutting tool 24 should be related in the same ratio as the other features of the machine and that in particular the diameters and tread forms should be so related. The diameter and tread form of the tracer wheel are chosen to suit the intricacies of the pattern—(tracer wheels are readily interchangeable) and the cutting tool must be trued or dressed to a form similar to that of the selected tracer. For this purpose a tool dresser unit 30 is provided and mounted to one side of the worktable 14; and the pattern table 13 carries a reference unit 31, so positioned on the table that when the tables are moved to bring the said unit 31 beneath the tracer wheel 23 the dresser unit 30 is situated beneath the cutting tool 24. Thus both the dresser unit and the reference unit are placed well to one side of their respective tables where they will not interfere with the mounting of the ordinary workpieces and patterns.

The dresser unit 30, which is shown in Fig. 3, embodies a dresser 32, which is circular in radial cross-section and preferably is cylindrical; it may be a diamond impregnated element or an ordinary grinding wheel (dependent upon whether the tool to be trued is a grinding wheel or a milling cutter) and is adapted to be revolved about a horizontal axis at right angles to the axis of rotation of the tool 24. To this end the dresser is supported on a spindle 33, which is carried in bearings in a U-shaped block 34; the block is in turn slidably mounted upon a horizontal platform or guide 35 at the top of an extensible column 36, and rotation of the spindle is effected by an electric motor 37, also mounted on the extensible column and driving through a reduction gear device 38 and a telescopic shaft 39. A knurled screw 40 is provided in the platform 35 to engage the block 34, whereby the longitudinal location of the block on the platform may be adjusted, extending or contracting the telescopic drive shaft 39. A micrometer sleeve 41 and an associated locking handle 42 control the length of the extensible column 36, so that the dresser 32 above the worktable 14 may be accurately adjusted in height and firmly locked at any desired setting.

The reference unit 31 which is mounted on the pattern table 13 is shown in detail in Figs. 4 and 5. The unit incorporates a master or reference 43, which is circular in radial cross-section and preferably is cylindrical and which is supported with its axis in a horizontal plane and parallel to the longitudinal axis of the machine (i. e. parallel to the axis of the dresser 32) between two vertical plates 44. The diameter of the reference 43 bears the same proportion to the diameter of the dresser 32 as the movement of the pattern table 13 bears to the movement of the worktable 14, by virtue of the pantograph linkage 17. The plates 44 are spaced apart and are secured to a channel-section base 45, which is in turn bolted to a bracket member 46 extending from the pattern table 13.

Two movable horizontal platforms or guides 47 and 47' are located at the upper edges of the plates 44, on either side of the reference; they are each mounted on a pair of parallel motion levers 48, accommodated in the space between the plates and actuated by pinions 49. The two pinions 49 engage a rack, which lies horizontally and slidably in the channel of the base 45 and which comprises two colinear portions, the portion 50 (that is the right hand portion as seen in Fig. 4) engaging the pinion controlling the right hand guide 47 and the left hand portion 50' engaging the pinion controlling the left hand guide 47'. The right hand portion 50 is fixed to the main body of the rack, whereas the left hand portion 50' is capable of movement along the main body of the rack under the control of an adjusting screw 51. The whole rack assembly may be reciprocated by a hydraulic piston and cylinder motor 52 mounted on the bracket 46 and connected to the rack by an adjustable rod 53.

The relationship of the parallel motion levers 48, the pinions 49 and the racks 50 and 50' is such that with the motor 52 at one end of its stroke the right hand guide 47 is raised so that its upper surface is substantially tangential with the reference 43; its exact elevation can be determined by adjustment of the rod 53. At this time the other guide is lowered so that its upper surface is approaching the horizontal axial plane of the reference. At the other end of the stroke the left hand guide 47' is raised into the substantially tangential position and its exact setting may be adjusted by turning the screw 51 and thereby moving the rack 50': the right hand guide 47 is simultaneously in the lower position. It will be observed that, in rising and falling, the edges of the guides adjacent the reference follow the contour of the reference; that is to say, they move horizontally as well as vertically. The upper surfaces of the guides 47 and 47' are advantageously covered by thin rubber pads 54 and 54' coated with a dry lubricant such as graphite.

Hydraulic power is supplied simultaneously to the piston and cylinder motor 19 and to the reference unit motor 52, and, as explained hereinunder, the motors are so arranged that the leading guide, that is the guide in the sense of travel of the pattern table carriage, is raised by the operation of the motor 52 before the pattern table carriage can be moved in the said sense by the motor 19.

The elements of the hydraulic system supplying the motors 19 and 52 are shown in Fig. 6. A pump 55, driven by an electric motor 56, draws hydraulic fluid from a tank 57 and directs it along a line 58 to a master control valve 59, which is housed in the control panel 21. The master valve is also connected to a solenoid-operated trip valve 60 by a feed line 61 and a return line 62; a further return line 63 is provided between the master valve and the tank 57. The trip valve 60 is mounted on the frame 19 and is actuated by adjustable stops on the worktable carriage 12; the stops may be set to trip the valve and thereby reverse the transverse motion of the carriages at any preselected positions. From the trip valve 60 flexible lines 64 and 65, acting respectively as feed and return lines according to the setting of the trip valve, extend to the pattern table carriage 11. Balance valves 66 and 67, which are mounted on the carriage, are provided in the lines, and the two motors 19 and 52 are connected in parallel across the said balance valves.

The bores of the motors 19 and 52 are so chosen in relation to the forces which they are required to exert that, under the same applied pressure, the motor 52 will function before sufficient pressure is built up to actuate the motor 19. In this way movement of the pattern table carriage 11 cannot occur until the reference unit 31 has completed its function and raised the appropriate guide in the direction of travel.

It will be understood that if, when the master valve 59 is actuated to set the system in motion, the trip valve 60 is so conditioned that pressure is applied through the line 64, hydraulic fluid will be directed to the left-hand sides of both the motors 19 and 52, as shown in Fig. 6. The ram of the motor 52 will therefore move towards the right and, as will be seen from Fig. 4, such movement will result in a counter-clockwise rotation of the pinions 49 coacting with the racks 50 and 50'; this rotation of the pinions will in turn cause clockwise rotation of the associated parallel motion levers 48, thus lowering the guide 47 and raising the guide 47'. The cylinder of the motor 19 is secured to the pattern table carriage 11 and the ends of the ram thereof are anchored, as shown in Fig. 1, to the frame 10; therefore, when sufficient pressure is built up in the left-hand end of the motor 19, the carriage will be urged towards the left.

The right-hand ends of the motors 19 and 52 exhaust through the line 65 into the trip valve 60 and so back through the lines 62 and 63 to the tank, the balance valve 67 in the return portion of the circuit serving to apply a constant back-pressure and thereby to control the speed of operation, in accordance with known hydraulic practice. The balance valves 66 and 67 are unidirectional and the valve in the feed portion of the circuit exerts no influence whatsoever.

Reversal of the trip valve 60 reverses the sequence, the motor 52 raising the guide 47 and lowering the guide 47' before the pattern table carriage 11 is moved to the right by the motor 19.

To illustrate the operation of the invention let it be assumed that the machine tool is designed to produce parts, reduced in a ratio of 5:1 from a given pattern; it will be understood of course that this ratio is taken as an example and that any other desired ratio may be built into the machine. Any horizontal movement of the pattern table 13 will therefore result in a proportional movement of the worktable 14, in the same sense and at one fifth the speed. Similarly any vertical movement of the tracer 23 will result in a proportional movement of the tool 24, in the same sense and at one fifth the speed. The diameter of the reference 43 is five times as great as the diameter of the dresser 32.

In operation a tracer wheel 23 is selected, having a diameter and tread form suitable to the curvatures of the surface of the pattern, and it is mounted on the lever 25. A tool 24, having a diameter equal to one fifth of the diameter of the selected tracer is then mounted on the lever and the controls on the panel 21 are actuated to bring the reference 43 beneath the tracer wheel 23; the tracer is then lowered into engagement with the reference. By means of the micrometer sleeve 41 the dresser 32 is raised until it engages the tool 24 and this adjustment is locked by means of the handle 42. If the dresser 32 is worn from previous use, a fresh portion of its surface may be brought to bear upon the tool 24 by adjusting its longitudinal position by means of the screw 40. The dresser is then set in motion by switching on the motor 37, which produces a slow rotation of the dresser spindle.

As the dresser 32 rotates in contact with the tool 24, the hydraulic motor 19 is energized to move the pattern table transversely of the longitudinal axis of the machine. The tracer 23, in contact with the reference 43, follows the contour thereof until it is lowered onto one or other of the guides 47 and 47'. (The rubber pads 54 and 54' on the guides reduce shock and the lubricant thereon allows the tracer to slide transversely along the guides without judder.) The preset trip valve 60 then reverses the supply of hydraulic fluid to the motors 19 and 52, so that, firstly, the lower guide supporting the tracer 23 is raised and, secondly, the pattern table 13, carrying the reference unit, begins to move in the opposite direction; this sequence eliminates any excessive pressure between the tracer and the reference which would otherwise result from the positive acceleration of the tracer derived from the "uphill" contour which the reference presents. At mid-stroke the tracer is transferred tangentially from the guide onto the reference 43 and thereafter follows the "downhill" contour of the reference until it rests upon the other guide.

In the meantime the worktable 14 also moves transversely of the longitudinal axis, in conformity with the movement of the pattern table, in the same sense and at one fifth the speed. Thus the dresser 32, which is mounted on the worktable, is moved across the tread of the tool 24, as the tool rises and falls proportionally to the movement of the tracer 23 under the control of the reference unit 31. The tread form of the tool 24 is therefore trued to present a one fifth scale reproduction of the tread form of the tracer 23.

The application of the invention to a pantograph machine tool of the type described is not to be taken as restrictive and it will be clear that a dresser and a reference thereof may be similarly applied to other types of pattern controlled machine tool where accurate conformity between the tracer and the cutting tool is of importance. Moreover, various changes in the shape, size and arrangement of the parts may therefore be resorted to without departing from the scope of the subjoined claims.

What I claim as my invention is:

1. In a pattern controlled machine tool, a pattern table for carrying a pattern, a worktable for carrying a workpiece, a tracer member for engaging a pattern on the pattern table, a tool member for engaging a workpiece on the worktable, means providing proportional three-dimensional movement between the tracer member relative to the pattern table and the tool member relative to the worktable in a predetermined ratio, a tool dresser which is circular in cross-section and is mounted on the worktable for engaging the tool member, and a reference which is circular in cross-section and is mounted on the pattern table with its axis parallel to the axis of the tool dresser for engaging the tracer member, the diameter of any radial section of the reference being proportional to the diameter of the corresponding radial section of the tool dresser in the said predetermined ratio, and the tool dresser and the reference being so positioned on the tables that when the tracer member is brought into engagement with the peripheral surface of the reference the tool member engages a corresponding part of the peripheral surface of the tool dresser.

2. In a pattern controlled machine tool, a pattern table for carrying a pattern, a worktable for carrying a workpiece, a tracer member for engaging a pattern on the pattern table, a rotary tool member for engaging a workpiece on the worktable, means providing proportional three-dimensional movement between the tracer member relative to the pattern table and the tool member relative to the worktable in a predetermined ratio, a tool dresser which is circular in cross-section and is mounted on the worktable for engaging the tool member, and a reference which is circular in cross-section and is mounted on the pattern table with its axis parallel to the axis of the tool dresser and at right angles to the axis of the tool member for engaging the tracer member, the diameter of any radial section of the reference being proportional to the diameter of the corresponding radial section of the tool dresser in the said predetermined ratio, and the tool dresser and the reference being so positioned on the tables that when the tracer member is brought into engagement with the peripheral surface of the reference the tool member engages a corresponding part of the peripheral surface of the tool dresser.

3. In a pattern controlled machine tool, a pattern table for carrying a pattern, a worktable for carrying a workpiece, a tracer member for engaging a pattern on the pattern table, a rotary tool member for engaging a workpiece on the worktable, means providing proportional three-dimensional movement between the tracer member relative to the pattern table and the tool member relative to the worktable in a predetermined ratio, a cylindrical tool dresser mounted on the worktable for engaging the tool member, the axis of the tool dresser being at right angles to the axis of rotation of the tool member, a cylindrical reference mounted on the pattern table for engagement of its peripheral surface with the tracer member, the axis of the reference being parallel to the axis of the tool dresser, the diameter of the reference being proportional to the diameter of the tool dresser in the said predetermined ratio, and the tool dresser and the reference being so positioned on the tables that when the tracer member is brought into engagement with the peripheral surface of the reference the tool member engages the peripheral surface of the tool dresser, and means for moving the tool dresser along its axis relative to the tool member whereby axially different portions of the peripheral surface of the tool dresser may be brought into engagement with the tool member.

4. In a pattern controlled machine tool, a pattern table for carrying a pattern, a worktable for carrying a workpiece, a tracer member for engaging a pattern on the pattern table, a rotary tool member for engaging a workpiece on the worktable, means providing proportional three-dimensional movement between the tracer member relative to the pattern table and the tool member relative to the worktable in a predetermined ratio, a cylindrical tool dresser for engaging the tool member, the axis of the tool dresser being at right angles to the axis of rotation of the tool member, a mounting on the worktable for the tool dresser comprising a horizontally disposed guide and a tool dresser bearing block adjustably slidably carried by the guide, and a cylindrical reference mounted on the pattern table for engagement of its peripheral surface with the tracer member, the axis of the reference being parallel to the axis of the tool dresser, the diameter of the reference being proportional to the diameter of the tool dresser in the said predetermined ratio, and the tool dresser and the reference being so positioned on the tables that when the tracer member is brought into engagement with the peripheral surface of the reference the tool member engages the peripheral surface of the tool dresser, the tool dresser mounting permitting the tool dresser to be moved along its axis relative to the tool member whereby axially different portions of the peripheral surface of the tool dresser may be brought into engagement with the tool member.

5. In a pattern controlled machine tool, a pattern table for carrying a pattern, a worktable for carrying a workpiece, a tracer member for engaging a pattern on the pattern table, a tool member for engaging a workpiece on the worktable, means providing proportional three-dimensional movement between the tracer member relative to the pattern table and the tool member relative to the worktable in a predetermined ratio, a tool dresser mounted on the worktable for engaging the tool member, and a reference mounted on the pattern table for engaging the tracer member, the said movement providing means including means to reciprocate the reference relative to the tracer member, the tool dresser and the reference being so positioned on the tables that when the tracer member is brought into engagement with the reference the tool member engages the dresser, the dimensions of the tracer member engaging surface of the reference being proportional to the corresponding dimensions of the tool member engaging surface of the tool dresser in the said predetermined ratio, movable guides at opposite sides of the reference to deflect the tracer member from the reference where the surface of the reference is such as would impart a positive acceleration to the tracer member during reciprocation of the reference relative to the tracer member.

6. In a pattern controlled machine tool, a pattern table for carrying a pattern, a worktable for carrying a workpiece, a tracer member for engaging a pattern on the pattern table, a tool member for engaging a workpiece on the worktable, means providing a proportional three-dimensional movement between the tracer member relative to the pattern table and the tool member relative to the worktable in a predetermined ratio, a tool dresser mounted on the worktable for engaging the tool member, a reference mounted on the pattern table for engaging the tracer member, the said movement providing means including means to reciprocate the reference relative to the tracer member, the tool dresser and the reference being so positioned on the tables that when the tracer member is brought into engagement with the reference the tool member engages the dresser, the dimensions of the tracer member engaging surface of the reference being proportional to the corresponding dimensions of the tool member engaging surface of the tool dresser in the said predetermined ratio, platforms at opposite sides of the reference for supporting the tracer member when it is adjacent the reference, a supporting mechanism on the pattern table for lifting a platform and simultaneously lowering the other, and control means for the supporting mechanism cooperating with the reciprocating means to lift the platform which is supporting the tracer member, prior to initiation of a stroke by the reciprocating means.

7. In a pattern controlled machine tool, a pattern table for carrying a pattern, a worktable for carrying a workpiece, a tracer member for engaging a pattern on the pattern table, a rotary tool member for engaging a workpiece on the worktable, means providing proportional three-dimensional movement between the tracer member relative to the pattern table and the tool member relative to the worktable in a predetermined ratio, a cylindrical tool dresser mounted on the worktable for engaging the tool member, the axis of the tool dresser being at right angles to the axis of rotation of the tool member, a cylindrical reference mounted on the pattern table for engagement of its peripheral surface with the tracer member, the axis of the reference being parallel to the axis of the tool dresser and the diameter of the reference being proportional to the diameter of the tool dresser in the said predetermined ratio, the said movement providing means including means to reciprocate the reference relative to the tracer member in a direction parallel to the axis of rotation of the tool member, the tool dresser and the reference being so positioned on the tables that when the tracer member is brought into engagement with the peripheral surface of the reference the tool member engages the peripheral surface of the tool dresser and movable guides at opposite sides of the reference to deflect the tracer member from the reference where the surface of the reference is such as would impart a positive acceleration to the reference during reciprocation of the reference relative to the tracer member.

8. In a pattern controlled machine tool, a pattern table for carrying a pattern, a worktable for carrying a workpiece, a tracer member for engaging a pattern on the pattern table, a rotary tool member for engaging a workpiece on the worktable, means providing proportional three-dimensional movement between the tracer member relative to the pattern table and the tool member relative to the worktable in a predetermined ratio, a cylindrical tool dresser mounted on the worktable for engaging the tool member, the axis of the tool dresser being at right angles to the axis of rotation of the tool member, a cylindrical reference mounted on the pattern table for engagement of its peripheral surface with the tracer member, the axis of the reference being parallel to the axis of the tool dresser and the diameter of the reference being proportional to the diameter of the tool dresser in the said predetermined ratio, the said movement providing means including means to reciprocate the reference relative to the tracer member in a direction parallel to the axis of rotation of the tool member, the tool dresser and the reference being so positioned on the tables that when the tracer member is brought into engagement with the peripheral surface of the reference the tool member engages the peripheral surface of the tool dresser, platforms at opposite sides of the reference for supporting the tracer member when it is adjacent the reference, a supporting mechanism on the pattern table for lifting a platform and simultaneously lowering the other, and control means for the supporting mechanism cooperating with the reciprocating means to lift the platform which is supporting the tracer member prior to initiation of a stroke by the reciprocating means.

JOHN OLIVER CREEK.

REFERENCES CITED

The following references are of record in the file of this patent:

UNITED STATES PATENTS

| Number | Name | Date |
|---|---|---|
| 2,030,850 | Atti | Feb. 18, 1936 |
| 2,171,211 | Day | Aug. 29, 1939 |
| 2,364,120 | Arms | Dec. 5, 1944 |
| 2,419,529 | Braaten | Apr. 29, 1947 |
| 2,488,088 | Marchant et al. | Nov. 15, 1949 |